US009469089B2

(12) United States Patent
Csatári

(10) Patent No.: US 9,469,089 B2
(45) Date of Patent: Oct. 18, 2016

(54) MULTILAYERED PRODUCT FOR JOINT UTILIZATION OF SMC, BMC AND PET WASTE

(71) Applicant: László Csatári, Felsőörs (HU)

(72) Inventor: László Csatári, Felsőörs (HU)

(73) Assignee: JÁGER INVEST Kereskedelmi, Szolgáltató és Ingatlanhasznosító Kft., Nemesvámos (HU)

(*) Notice: Subject to any disclaimer, the term of this patent is extended or adjusted under 35 U.S.C. 154(b) by 283 days.

(21) Appl. No.: 14/363,616

(22) PCT Filed: Dec. 6, 2012

(86) PCT No.: PCT/HU2012/000130

§ 371 (c)(1),
(2) Date: Jun. 6, 2014

(87) PCT Pub. No.: WO2013/084014

PCT Pub. Date: Jun. 13, 2013

(65) Prior Publication Data

US 2014/0363645 A1 Dec. 11, 2014

(30) Foreign Application Priority Data

Dec. 8, 2011 (HU) ..................................... 1100674

(51) Int. Cl.

| | |
|---|---|
| ***B32B 7/02*** | (2006.01) |
| ***B32B 27/14*** | (2006.01) |
| ***B32B 27/08*** | (2006.01) |
| ***B32B 5/30*** | (2006.01) |
| ***B32B 27/32*** | (2006.01) |
| ***B32B 27/36*** | (2006.01) |
| ***B32B 37/14*** | (2006.01) |
| ***B32B 27/18*** | (2006.01) |
| ***B32B 27/20*** | (2006.01) |
| ***B29B 17/00*** | (2006.01) |

(52) U.S. Cl.

CPC ........... *B32B 27/14* (2013.01); *B29B 17/0042* (2013.01); *B32B 5/30* (2013.01); *B32B 27/08* (2013.01); *B32B 27/18* (2013.01); *B32B 27/20* (2013.01); *B32B 27/32* (2013.01); *B32B 27/36* (2013.01); *B32B 37/14* (2013.01); *B32B 2250/03* (2013.01); *B32B 2250/40* (2013.01); *B32B 2260/00* (2013.01); *B32B 2260/046* (2013.01); *B32B 2260/048* (2013.01); *B32B 2262/00* (2013.01); *B32B 2262/02* (2013.01); *B32B 2262/101* (2013.01); *B32B 2262/103* (2013.01); *B32B 2262/106* (2013.01); *B32B 2264/0257* (2013.01); *B32B 2264/0285* (2013.01); *B32B 2264/10* (2013.01); *B32B 2270/00* (2013.01); *B32B 2272/00* (2013.01); *B32B 2305/30* (2013.01); *B32B 2305/70* (2013.01); *B32B 2307/102* (2013.01); *B32B 2307/304* (2013.01); *B32B 2307/712* (2013.01); *B32B 2307/7265* (2013.01); *B32B 2419/00* (2013.01); *B32B 2439/00* (2013.01); *B32B 2457/00* (2013.01); *B32B 2457/04* (2013.01); *Y02W 30/62* (2015.05); *Y10T 428/2495* (2015.01); *Y10T 428/249993* (2015.04); *Y10T 428/254* (2015.01)

(58) Field of Classification Search

None

See application file for complete search history.

(56) References Cited

U.S. PATENT DOCUMENTS

| | | | |
|---|---|---|---|
| 6,972,153 | B2 | 12/2005 | Mueller et al. |
| 2003/0003827 | A1 | 1/2003 | Mikats |
| 2003/0057590 | A1 | 3/2003 | Loher et al. |
| 2011/0262721 | A1 | 10/2011 | Albertelli et al. |

FOREIGN PATENT DOCUMENTS

| | | | |
|---|---|---|---|
| BY | 10123 | | 12/2007 |
| HU | 0303065 | A2 | 11/2007 |
| HU | 0500050 | A2 | 4/2010 |
| HU | 227 033 | B1 | 5/2010 |
| HU | 0900260 | A2 | 12/2010 |
| JP | 11-1999684 | | 7/1999 |
| JP | 11-256017 | | 9/1999 |
| RU | 2143443 | C1 | 12/1999 |

*Primary Examiner* — Aaron Austin
*Assistant Examiner* — Nicole T Gugliotta
(74) *Attorney, Agent, or Firm* — Jason D. Voight

(57) ABSTRACT

The invention relates to a layered product containing different types of plastic waste and process for preparing the same. Due to its toughness, weldability, insulation property and chemical resistance the layered product according to the invention is usable among others in construction industry, electric industry and chemical industry.

13 Claims, No Drawings

MULTILAYERED PRODUCT FOR JOINT UTILIZATION OF SMC, BMC AND PET WASTE

This is the national stage of International Application PCT/HU2012/000130, filed Dec. 6, 2012.

The invention relates to a layered product containing different types of plastic waste and process for preparing the same. Due to its toughness, weldability, insulation property and chemical resistance the layered product according to the invention is usable among others in construction industry, electric industry and chemical industry.

TECHNICAL BACKGROUND

Glass fiber reinforced plastic composites have specific role among thermoset plastics. Thermoset SMC (Sheet Molding Compound) products comprising glass fiber, in particular SMC products based on unsaturated polyester, further BMC (Bulk Molding Compound) products are widely used both outdoor and indoor. According to literature data their large scale use increases exponentially. On the other hand, this increase has significant disadvantages. Like all plastics, they degrade and finally become waste. Their decomposition lasts for many generations, the quick eradication is almost impossible, and the cost-effective recycling is unsolved. When burning a number of harmful substances are released. The reinforcement content further worsens the damaging effect of these composites on health and the environment.

The efforts required to destroy hazardous waste often exceed the efforts necessary to manufacture them. This refers both to technology and the expenses. In extremis, manufacturers may be required to repurchase waste.

Due to its large scale use, disposal of the increasingly accumulating amounts of PET bottle waste represents an increasing problem as well.

One possibility of handling plastic waste is recycling and no wonder that the related literature has considerably developed in the last years. Among the numerous publications dealing with the recyclation of plastic waste, mention can be made of the following cases.

In Hungarian Patent Application P0500050 a process is disclosed wherein thermoplastic granules are mixed with ground glass, for example glass fiber and/or porcelain waste or kaolin, then shaped between heated molding boards on 125 to 130° C. in 15 minutes. During mixing this material is highly abrasive and thus the screw feeder and the cylinder have to be provided with expensive, wear resistant coating. The end-product is an esthetic weather-resistant cover element, an outdoor decor, a flower-box, etc., however it does not show water repellency or water impermeability.

International Publication Document WO96/19336 relates to the preparation of structural elements prepared from thermoplastics containing fibers, and in particular reinforced with glass fiber, like wall-plugs or dowels.

Hungarian Patent Application P0900260 discloses a process for the preparation of sound insulation panel using sintered PET bottle waste. In this process the PET component is sintered on 130 to 160° C. On the effect of heat the PET material, which by itself is amorphous and unbreakable, recrystallizes and becomes brittle and fragile. The main disadvantage of the heat insulation product prepared by this process is that it cannot be prepared in the form of panel, furthermore it is not weldable owing to the properties of the cross-linking material used.

International Publication Document WO01/55524 discloses a multilayer lightweight sandwich panel, wherein the intermediate or core layer is foamed plastic. On each side of this core layer a perforated sheet-metal is placed under the outer layer. This product is continuously prepared by the use of multiple extruders and roll-feeders, and the final shape of the panel is formed between calender rolls.

Hungarian Patent Application P0303065 discloses the preparation of a multilayer plastic insulation sheet or film, wherein one of the layers comprises fiber with random structure, for example glass fiber, on a PVC-based supporting layer, and to one side of this layer another PVC-based layer is attached. Two layers of this product are joined and the final form of the layered sheet is created in continuous process applying line pressure between heated calender rolls. A disadvantage of this product is that its elastic modulus is low, further it cannot be welded.

British Patent Document 2 464 540 relates to a figured composite product comprising an open cell foam layer, a hardened plastic layer and a figured layer, for example a glass veil impregnated with the said hardened layer, where the hardened plastic layer preferably contains a filling agent and a reinforcing fiber and may also contain SMC.

Japanese Patent Document 11 199 684 relates to a layered product containing BMC or SMC sheets usable for decoration purpose, which product gives the impression of transparency.

Japanese Patent Document 11 256 017 relates to a fiber reinforced plastic molding free from unevenness, which can be painted to an even, intense colour.

Hungarian Patent 227033 discloses wear-resistant multilayer elastic sheets usable as covering for general purposes and indoor sports as well. The layer covering the surface of use contains solid particles and a glass fiber framework, and the underlying supporting layer consists of soft PVC, bulk or foamed polymers providing elasticity and flexibility.

None of the above documents disclose the layered products according to the present invention, since the present products are not only filled but also reinforced, contain different types of plastic waste and show excellent properties.

An aim of our work was to provide solution for the safe disposal of the increasingly accumulating amounts of non environmentally friendly thermoset plastic waste. With the present invention we surpassed this aim and created a reinforced layered product which shows advantageous properties, like high tensile strength and flexibility, further excellent heat, sound and electric insulation properties, besides it is easily weldable.

SUMMARY OF THE INVENTION

The above aims are achieved by a product comprising layers A-B-A, wherein layer A contains 55 to 85% by weight original granular polyolefin and/or recycled ground polyolefin, which optionally contain one or more materials selected from glass fiber, talc and EPDM, 15 to 40% by weight ground SMC and/or BMC waste, 10 to 15% by weight chopped polyethylene and/or polypropylene foil waste agglomerate, 0 to 1.5% by weight additive and 1 to 3% by weight colourant, wherein the particles of the ground SMC and/or BMC are fully covered by the polyolefin matrix, and layer B contains chopped PET bottle waste having average particle size in the range from 5 to 25 mm and optionally inclusions of air.

In an embodiment of the invention the particle sizes of the original granular polyolefin and the recycled ground polyolefin are 3 to 6 mm, the particle size of the ground SMC and BMC waste is 0.1 to 10 mm and the particle size of the polyethylene and polypropylene foil waste agglomerate is 3 to 6 mm.

In another embodiment of the invention the ground SMC and/or BMC waste in layer A of the layered product contains epoxy resin or polyester matrix and as reinforcing fiber textile fiber, glass fiber, mineral fiber, carbon fiber or metal fiber.

In another embodiment of the invention layer A of the layered product contains one or more additives selected from Ca stearate flow improvers, talc, UV resistance improving agents and fire retardants.

In another embodiment of the invention the polyolefin present in layer A of the layered product is a polyolefin mixture comprising as the main part, polypropylene, preferably in a part from 70 to 90%, which polyolefin mixture optionally contains glass fiber, talc and EPDM.

In another embodiment of the invention layer B of the layered product contains chopped unsorted PET bottles in mixed colours.

In an embodiment of the invention the thickness ratio of structural components A-B-A are A=2/5, B=1/5 and A=2/5.

The layered products according to the invention are advantageously used in the building industry, for example as watertight layers, or wear resistant surfaces of footpaths, pavements, platforms, or as formworks, or heat, sound and resonance insulation panels, further it can incorporate heating wires for melting ice or inductive or capacitive sensors, and also can be considered for covers of containers storing dangerous goods.

The invention also relates to a process for the preparation of the layered product containing plastic waste, according to the invention which process comprises the following steps:

step a) ground polyolefin or granular polyolefin having particle size from 3 to 6 mm is prepared, ground SMC and/or BMC waste having particle size from 0.1 to 10 mm is prepared, agglomerate having particle size from 3 to 6 mm is prepared by chopping polyethylene and/or polypropylene foil waste, the above materials are mixed with one or more additives and colourants, then homogenized and pressed to a sheet or a panel to obtain layer A, step b) chopped PET bottle waste having average size in the range 5 to 25 mm is prepared by chopping it up under its melting temperature using air cooling, step c) the chopped waste prepared in above step b) is evenly added as layer B, between two layers A to form structure A-B-A, step d) structure A-B-A formed in above step c) is pressed with heating to form the layered plastic product.

In an embodiment of the process according to the invention glass fiber reinforced SMC and/or BMC are used in the preparation of layer A, wherein the length of the glass fiber is adjusted by grinding said waste to appropriate particle size.

In an embodiment of the process according to the invention, in step a) layer A is prepared in the form of a panel having appropriate size, on 160 to 210° C. and a pressure from 30 to 200 MPa. In step c) the panel prepared in step a) is pre-heated to a temperature from 70 to 100° C., then the chopped material prepared in step b) is evenly added on it. After that a second panel formed from layer A according to the foregoing is placed on its top. In step d) structure A-B-A prepared above is pressed on a pressure from 200 to 400 MPa, at a temperature from 130 to 180° C., to form the layered plastic product.

In another embodiment of the process according to the invention, in step a) two layers A are prepared in the form of continuous sheets, and in step c) the chopped material prepared in step b) is evenly added between them to form structure A-B-A, and in step d) structure A-B-A formed in step c) is pressed between one or more pairs of rolls at a temperature from 160 to 200° C. using line pressure from 30 to 60 MPa, to form the layered plastic product.

In a further embodiment of the process according to the invention a chopped material having average size of about 25 mm is prepared in step b) of the previous process, and in step d) roller pressure from 30 to 40 MPa is applied at a temperature of around 160° C., to form a layered product having inclusions of air in layer B.

DETAILED DESCRIPTION OF THE INVENTION

During conducting examinations directed to recycling dangerous plastic waste we found that plastic sheets having excellent physical-chemical properties can be prepared by the use of layered structure A-B-A according to the present invention.

The advantageous properties of the layered product according to the invention is attained in the presence of reinforcing fibers or fiber reinforced ground BMC and/or SMC particles, which are surrounded and fully covered by polyolefin matrix. By recycling the plastic waste according to invention its harmful effect to the environment is neutralized, at the same time easily weldable product is obtained.

The length of the reinforcing fibers used is adjusted by grounding the BMC and/or SMC particles to proper size. Thus a product having pre-planned properties is prepared. Larger amounts of longer glass fibers results in more flexible product. On the other hand, in the case of smaller particles, the glass fibers extending from them bind the particles tight to the surrounding resin and thus a more rigid structure is obtained.

In addition to this the chopped PET bottle, which has been incorporated in the product without melting, keeps its original flexibility and fulfills reinforcing function as well.

The present description includes the following technical terms of plastic technology:

A matrix is a thermoplastic (i.e. a basic polymer) to which mainly inorganic materials (reinforcing and/or filling materials) are added, then homogenized. This is practically a pre-product.

The term compound relates to a reinforced and/or filled thermoplastic (usually in the form of granulate, prepared for further processing) which contains components having properties different from (i.e. better than) the properties of the matrix, such as higher elastic modulus, better fire retardant effect, higher UV resistance, better pigmentation, etc.

A composite is typically a (glass-)reinforced unsaturated epoxy or polyester thermoset. Its final rigidity is attained by heat curing.

Agglomerate represents a transitional state between ground and granulate. In an agglomerating equipment plastic foil shrinks on the effects of heat and sprayed water, and binds to particles usable in further technology.

EPDM (by exact name, ethylene-propylene-diene caoutchouc terpolymer) has excellent oil- and UV-resistant properties. This is an architectural insulation/protection sheet of general use. Introducing recyclate formed from EPDM waste into layer A according to the invention decreases the resultant rigidity of the multilayer product by shifting the matrix properties toward elasticity.

Due to the low melting temperature of the thermoplastic polyolefines included in layer A, the mixing extruder used in the process according to the invention for the preparation of layer A may be operated at a temperature as low as 160 to 180° C., which is 100° C. lower than the melting temperature of the PET bottle waste used as layer B. Thus the latter does not melt and also functions as reinforcing material, thereby improving the mechanical properties of the layered material according to the invention.

A further advantage of the present process is that it can be carried out without actually melting the recycled PET waste, i.e. in energy efficient manner, by which harmful emissions from combustion are avoided.

A still further advantage is that it permits the use of PET bottles in mixed colour, the utilization of which was not solved until now. Moreover, according to the invention unwashed PET bottles may also be used, which decreases environmental load.

By proper setting of technological parameters, like line roller pressure and the sizes of the ground PET waste particles, inclusions of air may be formed in layer B.

The advantageous properties of the layered product containing plastic waste, according to the invention allow a great variety of uses.

The layered product according to the invention has excellent mechanical properties, like high strength and excellent shock resistance. Besides, a sheet prepared from said product shows multiple rigidity comparing to conventional plastic sheets, moreover its bending strength is higher. Furthermore its life span is long and its weather resistance is excellent. In view of these properties they can be used in the building industry, for example as waterproof sheets and as wear resistant surfaces, footpaths, pavements and platforms and the like. Due to their adhesive surfaces they can also be used as formworks. By their application the use of expensive live wood can be avoided.

Due to its excellent heat-, sound- and resonance-insulating properties the product according to the invention can well be used as self-retaining sound insulation panels. This particularly applies to the embodiment where layer B includes inclusions of air.

Since the recycled starting material of the product by itself belongs to the self-quenching degree of flammability, the end-product can easily be made self-quenching by applying further fire retardant protection. This enables its use in the electric industry. Because of its high electric strength this product can be used for example as cable duct. It can also incorporate inductive or capacitive sensors.

In view of its chemical resistance its use as covers of containers storing dangerous goods can also be considered.

Over and above these favorable properties a further advantage is the good workability. This product shows good flexibility in the forms of both thick and thin films. Further it is easily weldable and thus it can be welded to panels. This way, large self-retaining panels can well be prepared.

The above properties can further be improved by adding various additives, and thus for example flame-tightness, UV stability and mechanical properties of the product can be improved.

The product according to the invention has an advantageous effect on the environment, since its preparation involves disposal of dangerous plastic waste. Furthermore the waste gradually arising from the product according to the invention is not as dangerous to the environment as the starting materials from which it is prepared, since it incorporates and fully covers the above-mentioned dangerous plastic waste basic materials.

In the following the invention further explained by way of examples. It is emphasized however that the invention is not limited to the embodiments disclosed in the examples.

EXAMPLES

Example 1

Preparation of Lightning Protection Base Plate

Lightning protection base plate having high electric strength is prepared by pressing, final size 300×400×8 mm. The lightning protection plate is placed between the roof insulation and the structure (buck) fastening the lightning arrester, which releases over-voltage.

Composition of layer "A":

- 55% by weight original granular polyolefin, particle size: 3 to 5 mm,
- 30% by weight ground waste including SMC and BMC in half-and-half ratio, particle size: 0.1 to 0.5 mm,
- 14% by weight polyethylene foil agglomerate, particle size: 3 to 5 mm,
- 1% by weight UV resistant inorganic colourant.

Layer "B" contains:

chopped PET, longest dimension: maximum 10 mm.

At first, layer "A" is prepared. Measured amount of the above composition is spread in an open press tool, then the upper die is let down and molding is carried out on 160° C. applying pressure of 100 MPa. The temperature of the press tool, holding (baking) time and final pressure is set using PLC (Programmable Logic Controller).

The base plate represented by structure "A-B-A" is prepared in another press tool. Layer "A" is preheated to 80° C. and placed in the tool, then the carefully portioned chopped PET as layer "B" is spread on its top, finally it is closed with a second layer "A" which was preheated according to the foregoing. The used pressing temperature is 170° C., final pressure is 220 MPa.

The thickness of the end-product is 8±0.25 mm, wherein layer "A" is 3.2 mm, layer "B" is 1.6 mm, within the defined tolerance limits. The electric strength data have been verified by experimental measurements.

The electric strength of the lightning protection base plate prepared above is 200 kV/mm measured according to Hungarian Standard MSZ EN 60450:2004.

Example 2

Preparation of Insulation Sheet Against Groundwater

Insulation sheet against groundwater is prepared in continuous process, between heated calender rolls, resultant width 2 m, thickness 2.5 mm. The insulation sheet is marketed in the form of roll stock with interposed impregnated paper layer to prevent adhesion.

Composition of layer "A":

75% by weight polyolefin component containing 65% by weight recycled ground polyolefin, typical particle size 3 mm, further 10% by weight EPDM recyclate, particle size also 3 mm, 15% by weight ground SMC and BMC waste, particle size: 0.1 to 0.5 mm, 10% by weight mixed polyethylene and polypropylene foil agglomerate, maximum particle size: 3 mm, no further additive or colourant is contained.

Layer "B" contains:

chopped PET, longest dimension: maximum 5 mm.

Process a):

When preparing the layer of composition "A", the components are mixed intimately, then this mixture is filled in the feed throat of an extruder screw. The homogenized material is converted to sheet in one step, applying wide mouth output (also called as wide slot output) commonly used in the practice of plastic industry. The operating temperature of the mixing extruder is between 160 to 170° C. After that this sheet is lead between multiple pairs of heated rolls to obtain layer "A" having width 2 m and thickness to about 1.2 to about 1.3 mm, which is then cooled and stored, as pre-product, in rolled form.

The preparation of sandwich structure "A-B-A" proceeds from two rolls of layer "A". They are passed between feed rolls pre-heated to 100° C., and PET forming layer "B" is evenly added between the two layers "A". In the practice this is carried out using a charging bend conveyor or a reciprocating screen. The layers are joined and final pressure is applied by a pair of calender rolls operating on 160° C. Line pressure of 40 MPa is applied. Of course the effective pressure in the neutral line of the material moved with wheel feed does not appear along a theoretical line.

Again, the dynamic process is controlled by PLC.

Process b):

This process is carried out as described above with the difference that two extruders are simultaneously used. The layers are joined right after production.

The end-product is 2.5 mm thick, wherein "A"=1 mm and "B"=0.5 mm. It is marketed in rolled form. The watertight sheet is welded, with the sheet's own material at the place using a special apparatus and a hot air blower.

Example 3

Preparation of Anti-Adhesive Layer of Plain Form Panel

Anti-adhesive layer of plain form panel is prepared in continuous process. The anti-adhesive surface of form work system used in building industry is always the surface that communicates with the poured concrete. Anti-adhesive element base size: 2×3 mm, thickness: 25 mm.

Composition of layer "A":

62.5% by weight recycled ground polyolefin, particle size: 5 to 6 mm, 31.0% by weight mixed ground SMC and BMC, particle size: 2 to 3 mm, 5.0% by weight polyethylene and polypropylene foil agglomerate, particle size:

5 mm, 1.5% by weight calcium carbonate as additive.

Layer "B" contains:

chopped PET, average size: 20 to 25 mm.

The preparation of layer "A" is carried out according to process b) of Example 2. Two extruders are used in continuous process. The operating temperature of the extruders is 170 to 180° C. A width of 2 m and a thickness of about 11 to 12 mm each are reached by passing each layer between two pairs of rolls heated to 140° C. The chopped PET bottles forming layer "B" is added between layers "A". The gathered layers are joined by passing them, between a single pair of high performance calender rolls. The temperature of the rolls is 180 to 200° C., the applied line pressure is 45 to 60 MPa.

The thickness of the anti-adhesive layer is 25 mm, that of layer "A" is 10 mm and layer "B" is 5 mm. The lamination is clearly visible to the necked eye. The width of the sheet is 200 cm. The multilayer sheet prepared in continuous process is cut to 300 cm long panels by commonly used wood working machine with intensive cooling.

The elastic modulus of the prepared anti-adhesive layer is 8 000 N/mm$^2$.

The preparation of continuous, large size surfaces is carried out by binding form panels with hot air welding. Robust, rigid and wear resistant form work system is prepared this way. The anti-adhesive form panels prepared according to the foregoing is used for continuous concreting in sliding form work technology.

Example 4

Preparation of Trap-Trough

Trap-troughs are prepared. They are used to catch oil and other dangerous liquids under electroplating tanks, acid accumulators, oil filled transformers, etc. In the practice, the size of a trap-troughs are individually planed or otherwise, pre-planed in a suitable volume series. Starting size of panel: 430×610×10 mm (standard A3 size, ⅛ m$^2$).

The panel is formed by pressing, side walls are cut off from the panels, and the trough is prepared by welding the base and the side walls together.

Composition of layer "A":

60% by weight original granular polyolefin and recycled ground polyolefin, predominating particle size: 2 to 4 mm, 25% by weight ground SMC and BMC waste, typical particle size: 2 to 3 mm, 15% by weight mixed polyethylene and polypropylene foil waste, average particle size of agglomerate: 3 mm.

Layer "B" contains:

chopped PET with average size 5 to 15 mm.

The preparation of layer "A" corresponding to the starting panel size is carried out as disclosed in Example 1.

Layered structure "A-B-A" is also prepared as disclosed in Example 1 with the difference that the final pressure is 330 MPa.

The thickness of the finished trap-trough base panel is 10 mm, that of layer "A" is 4 mm and layer "B" is 2 mm.

The panels prepared this way are shaped with conventional wood working tools. The trap-trough is assembled by binding the base panel and side walls using a hot air welding equipment and a welding rod made of the panel's own material.

Trap-troughs having basic area smaller than the size of the starting panel are formed by warming and raising the side walls using a special tool.

Example 5

Preparation of Thick Foil Usable for Recultivation

The recultivation thick foil is prepared in continuous process, between heated rolls. Width of foil: 1.6 m, thickness: 5 mm. It is marketed in the form rolled bala.

Composition of layer "A":

60% by weight particles of original granular polyolefin and recycled ground polyolefin with particle size: 2 to 3 mm, 21% by weight ground SMC and BMC waste: particle size 1 to 3 mm, 15% by weight chopped polyethylene foil waste agglomerate, particle size: 2 to 3 mm, 1% by weight anti-mold additive, 3% by weight UV-resistant colouring pigment.

Layer "B" contains:

chopped PET, typical longest dimension: 10 mm.

The preparation of layer "A" is carried out as disclosed in Example 2. In this example two parallel extruders are operated in continuous process. The operating temperature of the mixing extruders is 170° C. Each layer is passed between two pairs of rolls heated to 150° C. to reach a width of 1.6 m and a thickness of 2.2 mm each.

Layer "B" is charged as disclosed in the foregoing.

The preparation of structure "A-B-A" is carried out between calenders heated to 180° C., applying line pressure of 50 MPa.

The cross section are data of final recultivation foil is 5 mm, wherein layer "A" is 2 mm and layer "B" is 1 mm.

In the practice, the recultivation foil is used for large scale covers of dust holes, and to contain the dust of harmful materials (e.g. red mud) in storage. The foil can easily be spread and a continuous, air tight surface is formed applying hot air welding at the place. The foil is fixed by spreading soil on the surface.

Example 6

Preparation of Sound and Resonance Damping Panel

The sound and resoinance damping panel is prepared in continuous process. Width of the panel: 1 m, thickness: 30 mm. The length of the panel is set to meet the requirements of specific application.

Composition of layer "A":

70% by weight polyolefin component containing 50% by weight recycled ground polyolefin, typical particle size 3 to 5 mm, and 20% by weight EPDM recyclate, particle size 4 to 5 mm, 15% by weight ground SMC and BMC waste, particle size: 0.15 to 0.55 mm, 15% by weight chopped polyethylene and polypropylene foil agglomerate, particle size: 3 to 4 mm.

Layer "B" contains:

chopped PET, maximum size: 20 to 25 mm.

Layer "A" is prepared as disclosed in Example 2. Again, two parallel extruders are operated in continuous process.

Layer "B" is added between the two layers "A" as disclosed in the foregoing.

The technical parameters are identical with those mentioned in Example 3 with the difference that the line pressure between the calender rolls joining the layers is set suitable low, i.e. 35 MPa. This relatively low pressure value is favorable to the formation of tiny inclusions of air, i.e. which have diameter from 0.5 to 1 mm, in layer "B".

The sound and resonance damping panels prepared this way are usually cut to panel size 1×1 m. It may also be prepared with linear dimension of 2 m if required. The thickness of the end-product is 30 mm, that of layer "A" is 12 mm and layer "B" is 6 mm.

The damping of the sound and resonance damping panel prepared this way is 25 to 30 Db. The degree of sound or resonance damping can be enhanced by putting multiple damping panels according to the invention in acoustic series.

The invention claimed is:

1. Layered product containing plastic waste, comprising layers A-B-A wherein layer A contains 55 to 80% by weight original granular polyolefin and/or recycled ground polyolefin optionally containing one or more materials selected from glass fiber, talc and EPDM, 15 to 40% by weight ground SMC and/or BMC waste, 5 to 15% by weight chopped polyethylene and/or polypropylene foil waste agglomerate, 0 to 1.5% by weight additive and 0 to 3% by weight colourant, wherein the particles of ground SMC and/or BMC are fully covered by polyolefin matrix, and layer B contains chopped PET bottle waste having average particle size in the range from 5 to 25 mm and optionally inclusions of air.

2. The layered product according to claim 1 wherein the particle sizes of the original granular polyolefin and the recycled ground polyolefin are 3 to 6 mm, the particle size of the ground SMC and BMC waste is 0.1 to 10 mm and the particle size of the polyethylene and polypropylene foil waste agglomerate is 3 to 6 mm.

3. The layered product according to claim 1, wherein the ground SMC and/or BMC waste contains epoxy resin or polyester matrix and textile fiber, glass fiber, mineral fiber, carbon fiber or metal fiber.

4. The layered product according to claim 1, comprising in layer A one or more additives selected from Ca stearate flow improvers, talc, UV resistance improving agents and fire retardants.

5. The layered product according to claim 1 comprising as the polyolefin in layer A a polyolefin mixture, 70 to 90% being polypropylene, said polyolefin mixture optionally containing glass fiber, talc and EPDM.

6. The layered product according to claim 1, comprising in layer B unsorted chopped PET bottles in mixed colours.

7. The layered product according to claim 1, wherein the thickness ratio of the components of structure A-B-A are A=2/5, B=1/5 and A=2/5.

8. The layered product according to claim 1 which products are advantageously used as waterproof sheets, or wear resistant surfaces of footpaths, pavements, platforms, or as formworks, or heat, sound and resonance insulation panels in building industry, or as elements incorporating heating wires or inductive or capacitive sensors in electric industry, and as covers of containers storing dangerous goods.

9. Process for preparing the layered product containing plastic waste, according to claim 1, characterized in that the following steps are carried out:

step a) ground polyolefin or granular polyolefin is prepared, ground SMC and/or BMC waste is prepared, agglomerate is prepared by chopping polyethylene and/or polypropylene foil waste, the above materials are mixed with one or more additives and colourants, then homogenized and pressed to a sheet or a panel to obtain layer A, step b) PET bottle waste is chopped under its melting temperature using air cooling, step c) the chopped waste prepared in above step b) is evenly added as layer B, between two layers A to form structure A-B-A, step d) structure A-B-A formed in above step c) is pressed with heating to form the layered plastic product.

10. The process according to claim 9, characterized in that in the preparation of layer A, SMC and/or BMC waste containing glass fiber is used, wherein the length of the glass fiber is adjusted by grinding said waste to appropriate particle size.

11. The process according to claim 9, characterized in that in step a), layer A is prepared in the form of panel having suitable size by pressing on 160 to 200° C. and a pressure from 30 to 200 MPa, and in step c) the panel prepared in step a) is pre-heated to a temperature from 70 to 100° C., then the chopped material prepared in step b) is evenly added on it, after that a second panel formed from layer A according to the foregoing is placed on its top, and in step d) the formed structure A-B-A is pressed on a pressure from 200 to 400 MPa, at a temperature from 130 to 180° C., to form the layered plastic product.

12. The process according to claim 9, characterized in that in step a) two layers A are prepared in the form of continuous sheets, in step c) the chopped material prepared in step b) is evenly added between them to form structure A-B-A, and in step d) structure A-B-A formed in step c) is pressed between one or more pairs of rolls at a temperature from 160 to 200° C. using a line pressure from 30 to 60 MPa, to form the layered plastic product.

13. The process according to claim 12 characterized in that in step b) chopped material having average size of about 25 mm is prepared and in step d) roller pressure from 30 to 40 MPa is applied at a temperature of about 160° C., to form layered product having inclusions of air in layer B.

* * * * *